APPLIED VOLTAGE
→ TO CERAMIC HEATER
← TO ALLOY HEATER

AMBIENT TEMPERATURE

TEMPERATURE OF
COFFEE LIQUID

M. FUJIMURA
Y. KASAHARA
T. IGUCHI
Y. MATSUO
H. SASAKI
K. NAGASE
S. HAYAKAWA
Y. IIDA

INVENTORS

April 2, 1968     MASANORI FUJIMURA ET AL     3,375,774
FULLY AUTOMATIC ELECTRIC COFFEE POT Filed Jan. 5, 1967     5 Sheets-Sheet 3

M. FUJIMURA
Y. KASAHARA
T. IGUCHI
Y. MATSUO
H. SASAKI
K. NAGASE
S. HAYAKAWA
Y. IIDA

INVENTORS

BY Wendroth, Lind & Ponack

ATTORNEYS

April 2, 1968  MASANORI FUJIMURA ET AL  3,375,774
FULLY AUTOMATIC ELECTRIC COFFEE POT
Filed Jan. 5, 1967  5 Sheets-Sheet 4

M. FUJIMURA
Y. KASAHARA
T. IGUCHI
Y. MATSUO
H. SASAKI
K. NAGASE
S. HAYAKAWA
Y. IIDA
INVENTORS

BY Wenderoth, Lind & Ponack
ATTORNEYS

April 2, 1968   MASANORI FUJIMURA ET AL   3,375,774
FULLY AUTOMATIC ELECTRIC COFFEE POT Filed Jan. 5, 1967   5 Sheets-Sheet 5

M. FUJIMURA
Y. KASAHARA
T. IGUCHI
Y. MATSUO
H. SASAKI
K. NAGASE
S. HAYAKAWA
Y. IIDA

INVENTORS

BY  Wenderoth, Lind
&  Ponack

ATTORNEYS

United States Patent Office 3,375,774
Patented Apr. 2, 1968

3,375,774
FULLY AUTOMATIC ELECTRIC COFFEE POT
Masanori Fujimura, Moriguchi-shi, Yukio Kasahara, Neyagawa-shi, Takashi Iguchi, Kyoto-shi, Yoshihiro Matsuo, Suita-shi, Hiromu Sasaki, Osaka-shi, Kaneomi Nagase, Kyoto-shi, and Shigeru Hayakawa and Yoshio Iida, Hirakata-shi, Japan, assignors to Matsushita Electric Industrial Co., Ltd., Osaka, Japan
Filed Jan. 5, 1967, Ser. No. 607,421
9 Claims. (Cl. 99—281)

ABSTRACT OF THE DISCLOSURE

An automatic electric coffee pot having a heating unit consisting of a conventional alloy resistance heater connected in series with a positive temperature coefficient of resistance ceramic heater made of barium titanate semi-conductor, the circuit of the heating unit first causing the liquid to be heated to boiling to brew the coffee, and then the resistance of the ceramic heater abruptly rising to reduce the current flow and the temperature of the heating unit so as to keep the brewed coffee warm without further boiling.

Background of the invention—field of invention

This invention relates to an electric coffee pot capable of automatic operation, and more particularly to an electric coffee pot the heating system of which comprises a metal alloy heater and ceramic heater the electrical resistance of which rises abruptly at a certain temperature.

Description of the prior art

Conventional automatic coffee pots keep the temperature of the liquid coffee at a constant temperature after boiling by using a relay such as a bimetal switch. However, the contact of the relay is frequently apt to break down and to cause a failure in the operation of the coffee pot. Moreover, it is expensive to make an automatic coffee pot which is reliable in operation, because reliable operation requires a complicated electrical circuit and an expensive relay. The art has sought to make a fully automatic coffee pot which automatically boils the water for an initial period of time in order to prepare the coffee at a desired concentration, and subsequently keeps the prepared coffee warm at a desired temperature for a long time. Such a fully automatic coffee pot is very expensive when it is constructed in a conventional manner using complicated electrical circuit and controlling means.

Summary of the invention

An object of the invention is to provide an automatic coffee pot which has no relay contact.

Another object of the invention is to provide a fully automatic coffee pot which has no relay contact and which does not have a complicated electrical circuit.

The objects of the invention are realized by an automatic electric pot having a heating unit consisting of the ceramic heater mounted in the inside of a coffee container, and an alloy heater electrically connected in series with the ceramic heater and mounted on the coffee container for supplying heat to the liquid within the container. The ceramic heater is a semiconductive barium titanate ceramic which has an electrical resistance lower than that of the alloy heater at room temperature and rapidly increases in electrical resistance near the Curie temperature thereof. The voltage-current characteristics of the ceramic heater and the current flow-temperature characteristics of the coffee container when a given amount of liquid is contained therein cause an abrupt decrease in the current flowing through the heating system so as to keep the coffee warm at a given temperature after the coffee has been boiled for a pre-determined period of time.

Brief description of the drawings

The invention will be described in connection with the accompanying drawings in which.

Description of preferred embodiments

Before proceeding to a detailed description of the construction of the automatic coffee pot according to the invention, the novel heating system will be explained with reference to FIGS. 1–4 of the drawings.

Figure 1:
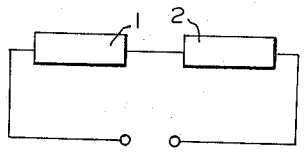
FIG. 1 is a circuit diagram of the temperature sensitive heating system of the present invention.

Referring to FIG. 1, terminals adapted to be electrically connected to current source are connected to a ceramic heater 1 and to an alloy heater 2, the ceramic heater 1 and the alloy heater 2 being connected in series with each other. Said alloy heater 2 is made of a conventional alloy resistor such as a Ni-Cr alloy resistor. Said ceramic resistor 1 is made of a so-called positive temperature coefficient of resistance (hereinafter abbreviated to PTC) barium titanate ceramic body which has a lower electrical resistance than that of the alloy heater at room temperature and abruptly increases its electrical resistance above a certain temperature. Such resistors are disclosed in the prior literature (e.g. U.S. Pats. 3,044,968 and 2,981,699).

Figure 2:
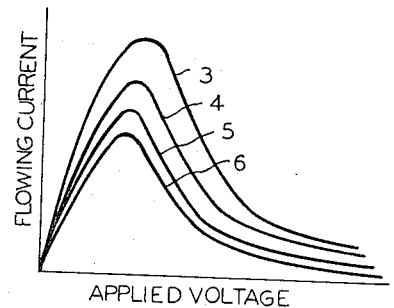
FIG. 2 is a graph showing the characteristic current vs. voltage curves of the ceramic heater of the invention operating at several ambient temperatures.

Referring to FIG. 2, reference characters 3, 4, 5 and 6 designate the characteristic voltage-current curves for said ceramic heater with respect to various ambient temperatures thereof. The ambient temperature increases in the order of curves 3, 4, 5 and 6. A current flowing through the ceramic heater increases with an increase in the applied voltage and there is an accompanying increase in the temperature of the ceramic heater itself. When the temperature exceeds a specified temperature, which depends upon the PTC characteristics of the ceramic heater, the current flowing through the ceramic heater decreases even with increasing applied voltage because of the PTC characteristics. The characteristic voltage-current curves for the ambient temperatures of the ceramic heater curve upwards at a lower applied voltage and then downwards at a higher voltage as shown in FIG. 2. When the ambient temperature is higher, a specified temperature is achieved by a lower applied voltage. Therefore, the characteristic voltage-current curves of the ceramic heater shift down with an increase in the ambient temperature, as shown in FIG. 2.

Figure 3:
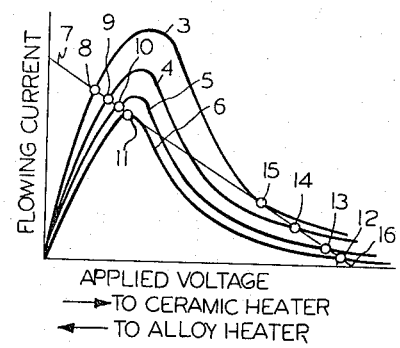
FIG. 3 is a graph showing the various operating points of the heating system at various temperatures.

FIG. 3 shows the operating points of the present novel heating system comprising said ceramic heater and alloy heater when a voltage 16 is applied to the heating system. The voltage current curves of the ceramic heater are designated by the same reference numbers as in FIG. 2. The load line of said alloy heater is represented by the reference character 7. As a practical matter, the load line varies slightly with the ambient temperature. However, the variation is negligible when compared with that of the ceramic heater. An operating point is defined by the intersection of a voltage-current curve of said ceramic heater with the load line of said alloy heater. The operating point can be determined by current flowing in the heating system and the voltages divided between the ceramic heater and the alloy heater. Since the voltage-current curves of said ceramic heater vary in the order 3, 4, 5 and 6 with increasing ambient temperature, the operating point also varies successively in the order 8, 9, 10 and 11 while there is an accompanying decrease of the current flow as shown in FIG. 3 in accordance with the invention. Since the characteristic curve 6 is tangent to the load line at the point 11, the operating point immediately moves from the point 11 to the point 12 as soon as the ambient temperature exceeds the temperature for the characteristic curve 6. Consequently, the current flow drops abruptly. The abrupt decrease in the current flow results in a decrease in the amount of heat radiated from the heating system. As the temperature goes down, the operating points move successively in the order 12, 13, 14 and 15 along the load line 7 while there is an accompanying increase of the current flow. Since the characteristic curve 3 is tangent to the load line at the point 15 as shown in FIG. 3, the operating point immediately moves from the point 15 to another operating point 8 with a further decrease in the ambient temperature. Thus, the flowing current and amount of heat radiating from the heating system increases abruptly.

Figure 4:
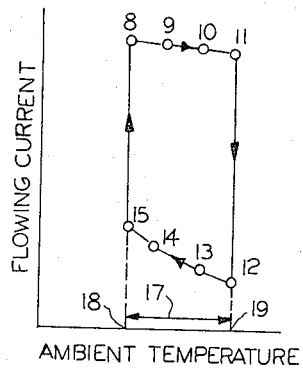
FIG. 4 is a graph showing the variation of current with variation of the ambient temperature of the ceramic heater of the heating system according to the present invention.

The ambient temperatures for the curve 3 and the curve 6 are respectively the lower limit and upper limit of the working temperature range of the present novel heating system. FIG. 4 shows the relation between the ambient temperature of the ceramic heater and current flowing in the heating system according to the invention. The operating points of the curve in FIG. 4 correspond to those in FIG. 3 and they are designated by the same numbers. The working temperature range of the present heating system is designated by 17 and its lower limit and upper limit are represented by the points 18 and 19, respectively. As the ambient temperature of the ceramic heater rises from the lower limit 18, the current flow decreases gradually in the order 8, 9, 10 and 11. When the ambient temperature of the ceramic heater reaches the upper limit 19, the current flow drops abruptly from the point 11 to the point 12. This abrupt decrease of the current lowers the ambient temperature of the ceramic heater. As the temperature goes down, the current flow gradually increases in the order 12, 13, 14 and 15. When the temperature falls to the lower limit 18, the current flow increases abruptly. Thus, the ambient temperature of the ceramic heater moves through a temperature cycle as shown in FIG. 4 according to the action of the present novel heating system. The lower limit 18 and the upper limit 19 can be predetermined by the thermal characteristics of the ceramic heater and the alloy heater.

The present novel heating system can be used as the heater for a coffee pot. The ambient temperature of the ceramic heater corresponds to the temperature of liquid coffee in the coffee pot.

Figure 5:
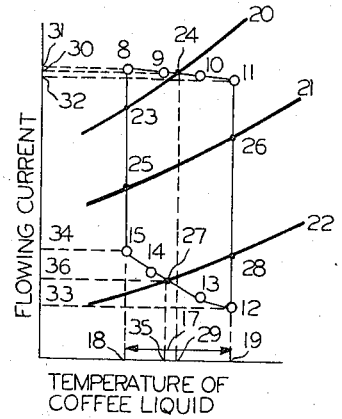
FIG. 5 is a graph showing a temperature cycle as shown in FIG. 4 and thermal characteristic curves of three typical coffee pots.

Referring to FIG. 5, the equilibrium temperature-current characteristics of three coffee pots with respect to their heat capacity are graphically represented by the curves 20, 21 and 22. The temperature cycle of the present novel heating system is also given. The curve 20 intersects the temperature cycle at the points 23 and 24, the curve 21 at points 25 and 26, and the curve 22 at points 27 and 28. The temperature of the liquid coffee in the coffee pot having the characteristic curve 20 reaches a thermal equilibrium at the temperature 29 and at the current flow 30. In the coffee pot having the characteristic curve 21 the temperature of the liquid fluctuates between the two temperatures 18 and 19 in such a way that the operating point repeatedly moves along the temperature cycle curve from 8 through 11, 12 and 15 back to 8. The temperature of the liquid coffee in the coffee pot having the characteristic curve 22 goes through the temperature 19 and reaches a thermal equilibrium at the temperature 35 and at the current flow 36.

Figure 6:
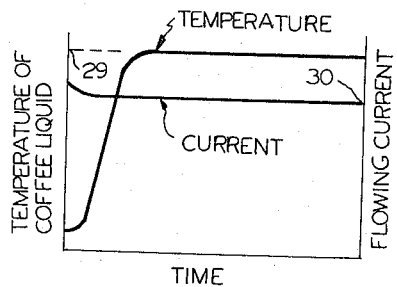
FIG. 6 is a graph showing a time-temperature curve of liquid coffee and a time-current flow curve of a coffee pot having the thermal characteristic curve 20 shown in FIG. 5.
Figure 7:
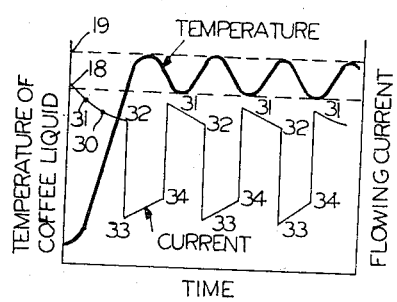
FIG. 7 is a graph showing time-temperature curve of liquid coffee and a time-current flow curve of a coffee pot having the thermal characteristic curve 21 shown in FIG. 5.
Figure 8:
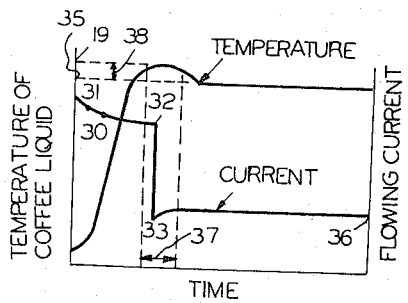
FIG. 8 is a graph showing a time-temperature curve of liquid coffee and a time-current flow curve of a coffee pot having the thermal characteristic curve 22 shown in FIG. 5.

Variations of temperature and current with the passage of time in these three typical coffee pots can be graphically represented as shown in FIGS. 6, 7, and 8, respectively, wherein the reference numbers are the same as those in FIG. 4. Among the three typical coffee pots mentioned above, the pot having the characteristic curve 22 is most desirable for practical use because of the following reasons. Referring to FIG. 8, the temperature of coffee liquid goes up to the maximum temperature 19 during the current flow 31, 30 and 32 and then decreases slowly with an abrupt decrease in the current flow from 32 to 33 in accordance with the invention. Then the current reaches an equilibrium value 36 and the temperature of coffee liquid is in equilibrium at the temperature designated by the reference number 35 in FIG. 8. The coffee liquid is slowly cooled from the temperature 19 and is kept at the temperature higher than the temperature 35 for a certain time interval 37. Since the temperature 19 can be controlled to be 100° C. by selecting appropriate heating power and heat capacity of the coffee pot, coffee can be extracted by the boiling water during the time interval 37. The warming temperature 35 can also be controlled to be any suitable temperature for drinking by selecting appropriate heat capacity and electrical resistance of ceramic heater and alloy heater in connection with their relative location described hereinafter.

A coffee pot having the novel heating system can automatically control the temperature of a given amount of liquid coffee in such a way that the water is heated up to the boiling point, kept at the boiling temperature for a certain time interval to produce liquid coffee of a desired concentration, and then the coffee liquid is kept warm at a desired temperature for a long time without further boiling.

A novel heating system according to the invention comprises a ceramic heater mounted in the inside of coffee pot and a conventional alloy heater connected in series with the ceramic heater. The electrical resistance of the ceramic heater is very much lower than that of the alloy heater at a room temperature of 10° C. to 30° C. and becomes very much higher that that of the alloy heater above the temperature at which the coffee liquid boils or is kept warm. The alloy heater and ceramic heater are selected so as to produce an alloy heater ceramic resistance ratio of from 500:1 to 2:1 at room temperature, and a ratio of from 1:500 to 1:2 after the liquid coffee has been heated up to a boiling temperature. In this heating system, the alloy heater is the main heat source until boiling occurs, whereas the ceramic heater is the main source of heat for warming after the boiling. After the boiling, the liquid coffee is kept warm at a certain temperature mainly by the heat radiated from the ceramic heater.

The ceramic heater can be made of any barium titanate ceramic having an abrupt increase in electrical resistance above a certain temperature. The barium titanate ceramic can be prepared by well known ceramic techniques. For example, 66.26 to 71.00% by weight of $BaCO_3$, 28.16 to 28.80% by weight of $TiO_2$, 0.10~2.79 percent by weight of $Al_2O_3$, and 0.10~2.79% by weight of $SiO_2$ are wet-milled for mixing. The resultant mixture is pressed into a disc of the desired form and fired in air at 1350° C. for 2 hours. The sintered disc is provided with electrodes on opposite surfaces by any available method. Preferred electrodes for a ceramic are silver electrodes made by painting silver paste on opposite surfaces of the disc and firing in a nitrogen atmosphere, or a nickel-phosphor alloy electrode made by electroless plating.

Figure 9:
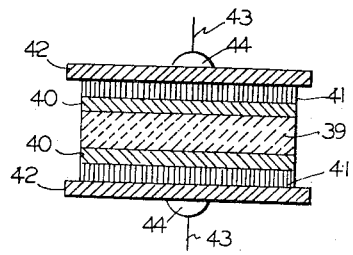
FIG. 9 is a cross sectional view of a ceramic heater comprising a semiconductive barium titanate ceramic disc having a large positive temperature coefficient of electrical resistance.

The produced disc has metal plates secured to the opposite surfaces by any appropriate means, such as soldering. Such a disc is shown in FIG. 9, in which is shown a barium titanate ceramic disc 39 provided with electrodes 40 on the opposite surfaces thereof and in which solder 41 is used for electrically connecting the disc 39 to metal plates 42. A lead wire 43 is electrically connected to the metal plate 42 by means of a solder 44. The solders 41 and 44 are required to have a melting point higher than the operating temperature of the ceramic heater. Said metal plates can be made of any metal or alloy such as nickel, copper, iron, nickel alloys, copper alloys and iron alloys.

Figure 10:
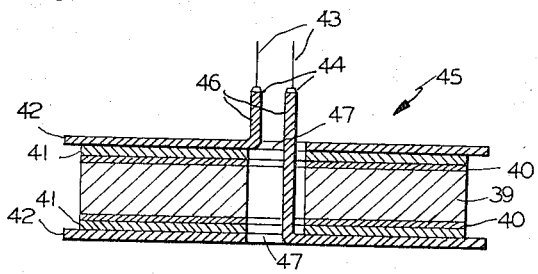
FIG. 10 is a cross sectional view of a ceramic heater according to the present invention having a hole at the center.
Figure 11:
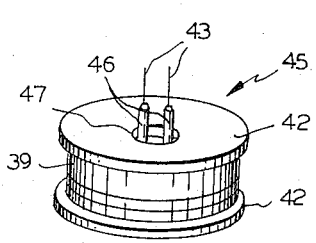
FIG. 11 is a perspective view of the ceramic heater shown in FIG. 10.

It has been discovered according to the invention that the disc 39 and metal plates 42 can be holed as shown in FIGS. 10 and 11. Reference character 45 represents, as a whole, a novel ceramic heater according to the invention. The metal plates 42 are holed and a thin strip 46 is left for ease in connecting the lead wire 43 to the plate 42. The strip 46 is bent upwardly at the circumference of hole 47. The metal plates are assembled so that the strip 46 on the lower metal plate projects through the hole 47 in the upper plate, as shown in FIGS. 10 and 11. This arrangement facilitates easy electrical connection to an outside electrical source when the ceramic heater is attached to the coffee pot.

It has been found that the ceramic heater comprising a plurality of barium titanate ceramic discs achieves a more efficient heat radiation than a single barium titanate ceramic disc does. In addition, the temperature program i.e. the time interval during which boiling occurs designated by reference number 37 in FIG. 8 and the temperature difference 38 between the boiling temperature and the warming temperature can be controlled by using PTC barium titanate ceramics having different Curie temperatures at which the electrical resistance abruptly rises.

Figure 12:
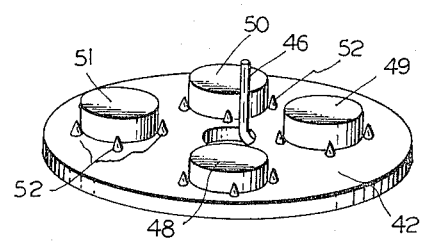
FIG. 12 is a perspective view of a ceramic heater comprising the plurality of positive temperature coefficient of resistance ceramic discs and a pair of metal plates having projections thereon for holding the plurality of ceramic discs with the upper metal plate omitted to better illustrate the construction of the heater.

Referring to FIG. 12, reference character 42 designates the same metal plate as shown in FIGS. 9, 10 and 11 and 46 designates the thin strip for completing an electrical connection. The metal plate 42 is adhered to the PTC barium titanate discs 48, 49, 50 and 51 all of which are of equal thickness. The PTC disc 48 has a different Curie temperature from other discs 49, 50 and 51. The difference is required to be from 50° to 100° C. For example, the ceramic disc 48 has a Curie temperature of 80° C. and the other discs 49, 50 and 51 have a Curie temperature of 150° C. at which their electrical resistance rises sharply. The number of discs need not be limited to four as indicated in FIG. 11; any number can be used. The plurality of PTC barium titanate ceramic discs can be held at predetermined positions by using metal plates having small projections 52 on the surface as shown in FIG. 12. The discs 48, 49, 50 and 51 are placed among the projections 52 and soldered to the metal plate 42 by a solder. The projections 52 on the lower plate 42 are operable to hold the discs by themselves, but it is preferable that both metal plates be provided with the projections 52. The projections 52 can be made by any available method such as adhering small nails of metal to the metal plate 42 by soldering. The height of projections 52 is necessarily less than the thickness of the discs 48, 49, 50 and 51 if the projections 52 are attached to only the lower metal plates 42. When both metal plates are provided with the projections 52, the height of projections 52 must be less than half the thickness of the discs.

Figure 13:
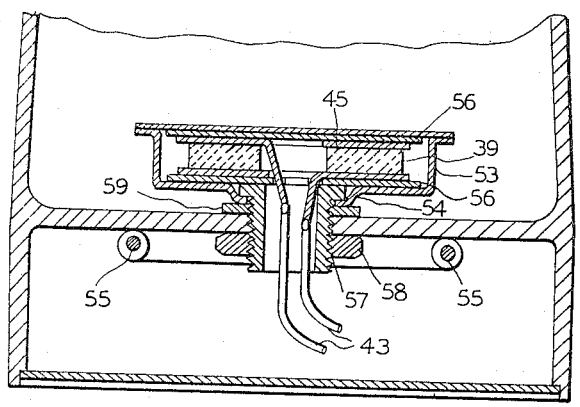
FIG. 13 is a cross sectional view of a ceramic heater mounted in the interior of the bottom of a coffee pot.

The resultant ceramic heater is encased in a metal case and is mounted in the bottom of a coffee pot. Referring to FIG. 13, reference character 39 designates a ceramic heater like that shown in FIGS. 10 and 11 and 53 is a metal case containing the heater and having a cover in water-tight engagement thereon and secured by any available method such as soldering or seaming. The metal case 53 is spaced from the bottom face of the coffee pot as shown by a projection 54 in order to insure that the ceramic heater 45 is only very slightly affected by the heat developed in the alloy heater 55. The ceramic heater 39 is electrically insulated from its metal case 53 by any conventional material, such as mica plates 56. The projection 54 is connected to a screw 57 having a hole therein. Lead wires 43 having electrical insulation thereon extend through the hole to an external electrical source. The metal case 53 containing the ceramic heater 39 therein is tightly secured to the bottom of the coffee pot by a nut 58. A rubber ring 59 is inserted between the bottom of the coffee pot and the projection 54 in order to prevent water leakage and to reduce heat transfer to the ceramic heater from the alloy heater. An alloy heater 55 having any conventional construction is attached to the outside surface of the bottom of the coffee pot and is electrically insulated from the pot by any conventional means. A convenient alloy heater is one in which the alloy heating element is in the form of a thin plate and is embedded in a mica plate. The alloy heater 55 is electrically connected in series with the ceramic heater 39 in a conventional manner and is coupled to a terminal of an electrical source (not shown).

Figure 14:
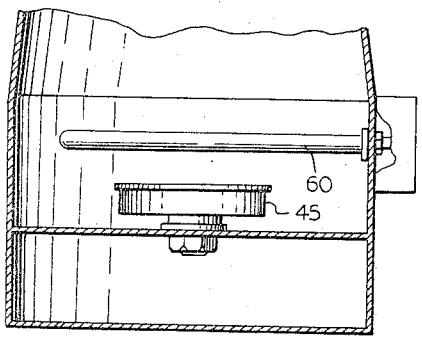
FIG. 14 is a cross sectional view of a coffee pot having an alloy heater at a position higher than that of the ceramic heater.
Figure 15:
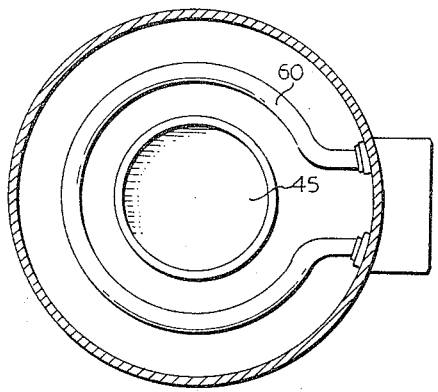
FIG. 15 is a transverse sectional view of the coffee pot shown in FIG. 14.

While the alloy heater 55 can be positioned in any convenient location to produce the novel coffee pot, it has been discovered according to the invention that a more stable operation of the coffee pot can be accomplished by locating the alloy heater at a level above the ceramic heater in the coffee pot. When the alloy heater is located above the ceramic heater it does not thermally affect the ceramic heater because the hot water heated by the alloy heater does not readily circulate in the space below the level of the alloy heater until turbulent circulation due to boiling develops. Therefore the ambient temperature of the ceramic heater remains at a lower temperature than the temperature of alloy heater located at the level above the ceramic heater until the water boils, and then it jumps to a higher temperature due to contact with the boiling water. The warming temperature is determined mainly by the heat capacity of the ceramic heater. Thus a decrease in heat energy transferred to the ceramic heater from the alloy heater results in an increase in the temperature difference designated by reference number 38 (FIG. 8) and a decrease in the time interval disignated by 37 (FIG. 8). FIGS. 14 and 15 show one embodiment in which a ceramic heater 45 is attached to the bottom of the coffee pot in the arrangement described above and an alloy heater 60 covered by a metal case is located at a level above the ceramic heater and the heaters are electrically connected in series. A preferred construction of the alloy heater according to the invention is one in which an alloy heating element is embedded in a metal pipe and is electrically insulated therefrom by an insulating material such as ceramic powder or glass fiber.

Figure 16:
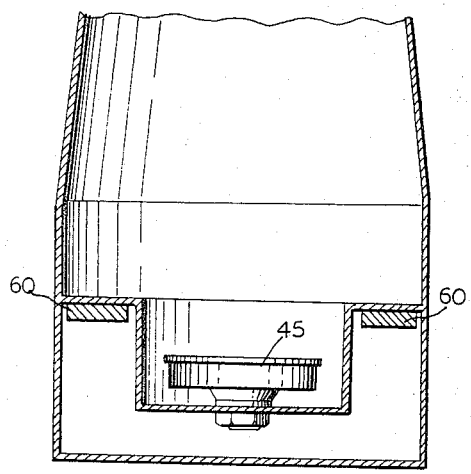
FIG. 16 is a cross sectional view of a coffee pot having a recess in the bottom for mounting a ceramic heater.

FIG. 16 shows another arrangement such as described above, and in which reference character 60 designates an alloy heater in a pipe and 45 is a ceramic heater which is electrically connected in series to the alloy heater 60. The coffee pot has a depression in the bottom thereof formed by a downward projection of the bottom. The ceramic heater 45 is mounted in the depression so as to lessen the thermal effect of alloy heater 60. It is necessary that the upper surface of ceramic heater 45 be lower than the inside surface of the bottom of the coffee pot which is contacted by the alloy heater 60.

Figure 17:
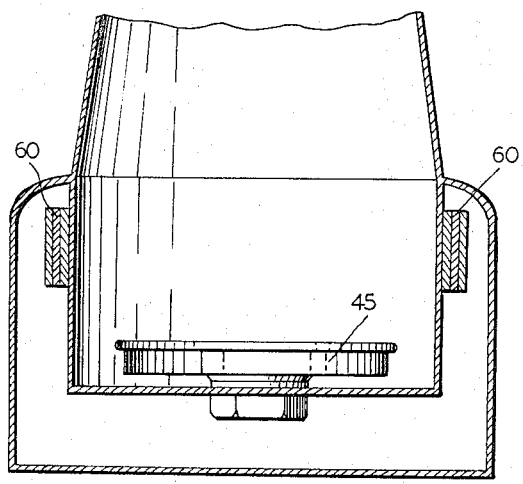
FIG. 17 is a cross sectional view of a coffee pot having an alloy heater mounted externally thereof at a position higher than that of a ceramic heater mounted in the bottom.

Another good arrangement of a ceramic heater and an alloy heater is the construction shown in FIG. 17, wherein the alloy heater 60 is attached to the external surface of the side wall of the coffee pot at a position higher than the bottom surface of the pot, and a ceramic heater 45 is mounted at the bottom surface by a construction illustrated above in FIG. 13. The alloy heater 60 is electrically connected in series with the ceramic heater 45 and is coupled to the terminals of an electrical source by means not shown. In this construction, the alloy heater is preferably in the form of a belt such as a Nichrome strip (Ni-Cr alloy) sandwiched between two flexible asbestos plates. An alloy heater having a pipe construction as described above also can be used in this arrangement.

It is important that hot liquid coffee in the pot circulate freely around the ceramic heater 45 which also plays the role of a temperature sensitive switch. Therefore, it is necessary that nothing prevent the circulation of hot liquid coffee around the ceramic heater. For this reason, the coffee basket and stem are required to have a specific construction.

Figure 18:
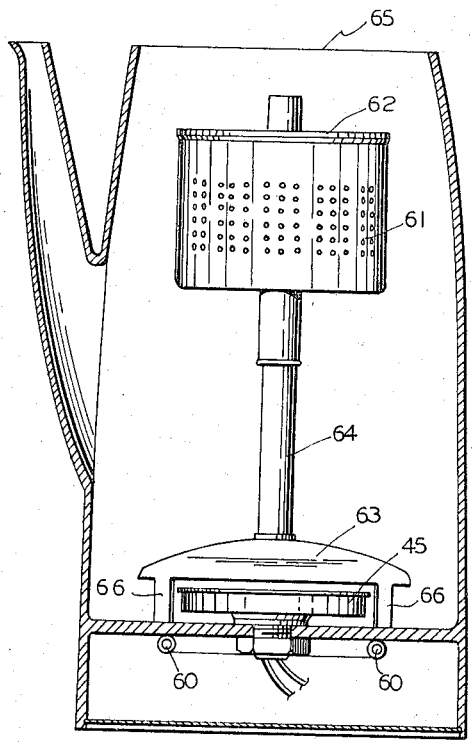
FIG. 18 is a cross sectional view of an entire coffee pot according to the invention.
Figure 19:
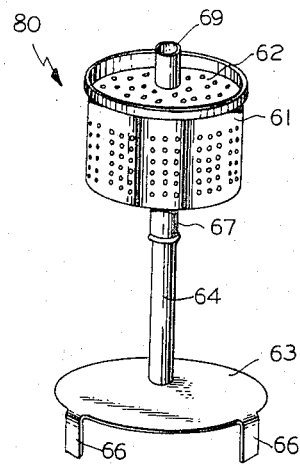
FIG. 19 is a perspective view of the basket and stem of the coffee pot of FIG. 18.

Referring to FIGS. 18 and 19, reference character 80 designates, as a whole, a coffee basket and stem arrangement comprising the coffee basket 61 covered by a perforated cover 62 and a stem support 63 having the three legs 66. Liquid and vapor come up through the stem 64 and the vapor condenses on the cover 65 and the liquid falls on the perforated cover 62 so as to extract coffee. The ceramic heater 45 has the three legs 66 spaced therearound and is contacted by the freely circulating hot liquid coffee. This coffee basket and stem arrangement permits the ceramic heater to operate satisfactorily as a temperature sensitive switch.

The concentration of the liquid coffee is dependent upon the amount of coffee in the aforesaid coffee basket 61 and the boiling period for each given amount of water. A given construction of the automatic coffee pot has a definite boiling period depending on the characteristics of the above described heating system. In order to prevent excessive extraction of coffee during the definite boiling period, the novel fully automatic coffee pot has a specific coffee basket and stem arrangement in accordance with the invention.

Figure 20:
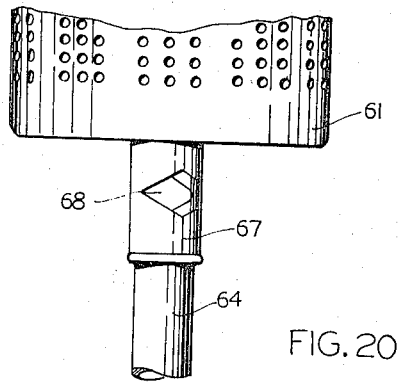
FIG. 20 is a side elevation view of a part of a basket and a stem having a hole for controlling the amount of water vapor to be condensed for extracting coffee.

Referring to FIG. 20 wherein the same reference characters represent the same components as those in FIGS. 18 and 19, the coffee basket 61 has a downwardly projecting sleeve 67 fitting closely around the stem 64. Both stem 64 and sleeve 67 are provided with an aperture at the same level which aperture together define a hole 68. The area of the hole 68 is adjusted by a rotation of the coffee basket 61 relative to the stem 64. When the hole 68 is completely closed by the projecting sleeve 67, all of the water vapor and liquid comes out from the top 69 of the stem. When the hole 68 is completely open, all of the water vapor and liquid comes out of the hole 68 and does not go up to the top 69. Adjustment of area of hole 68 permits control of the amount of water vapor and liquid available for extraction of coffee during a given boiling period and can control the concentration of the liquid coffee. It is necessary in order to prevent the water vapor and liquid from coming out of the top 69 that the maximum area of the hole 68 be of the magnitude of one half to two times the area of the opening at the top 69. One can easily prepare coffee having the desired concentration and taste by adjusting the area of hole 68 and can keep the thus produced coffee warm for a long time in accordance with the novel operation of the present fully automatic coffee pot.

As described above, the novel heating system comprising a ceramic heater and an alloy heater according to the invention operates in such a way that the voltage applied to the heating system is divided between the alloy heater and the ceramic heater in the ratio of from 500:1 to 2:1 during the boiling period and then in a ratio of from 1:500 to 1:2 after the boiling period. This voltage change easily facilitates providing a lamp indicating that the coffee is being kept warm for drinking after boiling.

Figure 21:
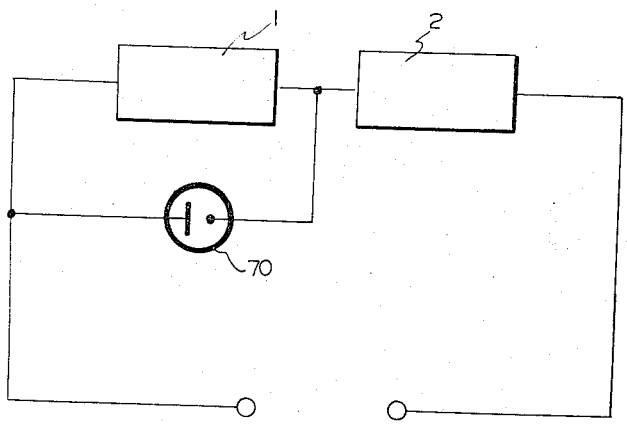
FIG. 21 is an electrical circuit diagram of an indicating lamp for indicating the operation of the coffee pot according to the invention.

Referring to FIG. 21, reference character 1 designates a ceramic heater and 2 is an alloy heater which is connected in series with said ceramic heater 1, these reference characters being the same numbers as in FIG. 1. A neon lamp 70 which operates above a certain voltage is connected in parallel with the ceramic heater 1. When the voltage of the electric source is applied across the terminals, the voltage is divided into two parts, i.e. the voltage applied to the ceramic heater 1 and the voltage applied to alloy heater 2. An extremely small voltage is supplied to the ceramic heater 1 because the ceramic heater has a resistance much lower than that of the alloy heater at lower temperatures. When the ambient temperature of the ceramic heater goes up due to the heat energy of the alloy heater and reaches a specific temperature, the ratio of electrical resistance of the ceramic heater 1 to alloy heater 2 becomes from 500:1 to 2:1. Therefore, the voltage applied across two ends of the ceramic heater 1 becomes sufficient to actuate the neon lamp 70 so that it lights. In such a way the neon lamp 70 can indicate the time at which the coffee is ready for drinking and is kept warm by the ceramic heater. The neon lamp 70 can be attached to the automatic coffee pot in any conventional and suitable manner.

What is claimed is:

1. An automatic electric coffee pot comprising a liquid coffee container, a heating system comsisting of a ceramic heater mounted in the inside of said coffee container and an alloy heater electrically connected in series with said ceramic heater and mounted on said coffee container for supplying heat to liquid within said container, said ceramic heater consisting of semiconductive barium titanate ceramic which has an electrical resistance lower than that of said alloy heater at room temperature and rapidly increases in electrical resistance near the Curie temperature thereof, the voltage-current characteristics of said ceramic heater and the current-flow-temperature characteristic of said coffee container for a given amount of liquid causing an abrupt decrease in the flowing current through said heating system so as to keep the liquid coffee warm at a given temperature after the liquid coffee boils for a predetermined time period.

2. An automatic electric coffee pot as claimed in claim 1, wherein the ratio of the resistances of said alloy heater and said ceramic heater at room temperature is from 500:1 to 2:1 and the said electrical resistance ratio after the rapid increase of resistance of said ceramic heater is from 1:500 to 1:2.

3. An automatic electric coffee pot as claimed in claim 1, wherein said ceramic heater is a single body of barium titanate ceramic in the shape of a disc having a hole at the center thereof and has electrodes on the opposite surfaces thereof, and a metal plate having holes at the center over each electrode.

4. An automatic electric coffee pot as claimed in claim 1, wherein said ceramic heater is a plurality of discs of said barium titanate ceramic and two metal plates each having a hole therein and between which said discs are held.

5. An automatic electric coffee pot as claimed in claim 1, wherein said ceramic heater is mounted at the bottom of the interior of said coffee container and said alloy heater is at a level higher than that of said ceramic heater, so that the ambient temperature of said ceramic heater jumps to boiling temperature only when the coffee liquid boils.

6. An automatic electric coffee pot as claimed in claim 1, wherein said coffee container has a depression in the bottom surface thereof and said ceramic heater is mounted in the depression in the interior of said coffee container, and said alloy heater is attached to the exterior surface of the undepressed portion of the bottom of the coffee container.

7. An automatic electric coffee pot as claimed in claim 1, wherein said coffee pot includes a coffee basket and stem arrangement having a stem with a stem support having three legs supporting the stem spaced from the ceramic heater to facilitate smooth circulation of hot liquid coffee around said ceramic heater.

8. An automatic electric coffee pot as claimed in claim 1, wherein said coffee pot includes a coffee basket and stem arrangement, said stem having a hole therein and an outlet at the top through which liquid and water vapor are discharged, said coffee basket having a downwardly extending sleeve with a hole therein in register with said hole in said stem, the area of the opening defined by said holes being varied by rotating the coffee basket.

9. An automatic electric coffee pot as claimed in claim 1, and a neon lamp connected in parallel with said ceramic heater for indicating the time at which the coffee is kept warm after boiling.

References Cited

UNITED STATES PATENTS

| 1,101,821 | 6/1914 | Aller | 219—19 |
| 1,816,994 | 8/1931 | Armstrong | 99—281 |
| 2,950,375 | 8/1960 | Sullivan | 99—281 X |
| 3,059,092 | 10/1962 | Olson | 219—441 |
| 3,187,164 | 6/1965 | Andrich | 219—504 |
| 3,231,522 | 1/1966 | Blodgett et al. | 338—22 X |

FOREIGN PATENTS 342,230  7/1936  Italy.

WILLIAM I. PRICE, *Primary Examiner.*